(12) United States Patent
Reichle (10) Patent No.: US 7,017,828 B2
(45) Date of Patent: Mar. 28, 2006

(54) BLOWER ASSISTED HEATING AND DEFOGGING SYSTEM FOR SMALL AIRCRAFT

(76) Inventor: Carl Heinz Reichle, 247 Riverside Drive, Prince Albert, SK (CA) S6V 2W9

( * ) Notice: Subject to any disclaimer, the term of this patent is extended or adjusted under 35 U.S.C. 154(b) by 130 days.

(21) Appl. No.: 10/808,091

(22) Filed: Mar. 24, 2004

(65) Prior Publication Data

US 2004/0256478 A1    Dec. 23, 2004

(30) Foreign Application Priority Data

Jun. 20, 2003    (CA) .................................... 2433496

(51) Int. Cl.
*B60H 1/02* (2006.01)
(52) U.S. Cl. .................... 237/12.3 C; 454/73
(58) Field of Classification Search ............... 454/70, 454/73, 74, 75, 76; 237/12.3 C, 12.3 R; 244/118.5
See application file for complete search history.

(56) References Cited

U.S. PATENT DOCUMENTS

| | | | |
|---|---|---|---|
| 2,265,168 A | | 12/1941 | Huffman |
| 3,583,658 A | * | 6/1971 | Herweg ................. 244/118.5 |
| 3,971,511 A | * | 7/1976 | Casey ................... 237/12.3 A |
| 4,490,989 A | | 1/1985 | Keen |
| 4,814,579 A | * | 3/1989 | Mathis et al. ............... 219/202 |
| 5,327,744 A | * | 7/1994 | Frawley et al. ............... 62/401 |
| 6,012,515 A | * | 1/2000 | Stubbendorff et al. ...... 165/257 |

* cited by examiner

*Primary Examiner*—Derek S. Boles
(74) *Attorney, Agent, or Firm*—Galgano & Burke, LLP (57) ABSTRACT

For the purposes of increasing pilot visibility and comfort in small planes during winter conditions, this invention provides an auxiliary heating system. Prior to actual flight, that is to say that during start up, warm up, taxi and takeoff, a small aircraft does not intake sufficient outside air to warm the cabin and defrost the windshield. The normal heating system on a small plane depends upon ram air when the plane is flying at normal speeds. This invention consists of a simple replacement part, mainly an electric blower which sucks in air from outside the aircraft and forces it through the muffler shroud and thereafter into the cabin and defroster ducts. The system is operated by a switch located on the control panel. Once the aircraft is in flight, the system may be shut off as there is sufficient ram air to heat the small aircraft.

13 Claims, 7 Drawing Sheets

BLOWER ASSISTED HEATING AND DEFOGGING SYSTEM FOR SMALL AIRCRAFT

PRIORITY CLAIM

Priority is claimed based on Canadian Patent Application No. 2,433,496, filed Jun. 20, 2003.

FIELD OF THE INVENTION

This invention relates to heating and defogging systems for small aircraft when not in flight.

BACKGROUND

Large planes, commercial aircraft, jet aircraft and military helicopters are all equipped with very extensive heating, defogging and air conditioning systems for the cabin, whether in flight or on the ground.

Small aircraft, however, are normally equipped with simple systems which, when in flight, take in ambient air and the ram speed of the aircraft pushes the ambient air past an exhaust manifold or other source of heat and through ducts into the cabin. Unfortunately, when an aircraft is not in flight, there is no ram air pushing through the heating system. This creates serious problems in cold, wintry conditions, particularly in northern climates such as Canada or the northern United States. During start up, warm up, taxi, takeoff and prior to flight, the cabin is extremely cold and uncomfortable. A more serious problem, however, is that the pilot's visibility is poor because off fogging windows. During taxi and takeoff, this can lead to serious accidents. Therefore, it appears that some sort of auxiliary system during winter conditions for start up, taxi and takeoff is needed.

A review of the literature, prior art, and aircraft now in service, has revealed to the present inventor that this cold weather problem has not been solved, and pilots and passengers in small planes continue to complain.

Blowers have been used in heating and cooling application for some aircraft but none address the current problem. In U.S. Pat. No. 4,490,989, issued to Keen on Jan. 1, 1985, a helicopter heating and air conditioning system is described for turbine engine-powered helicopters. The invention is not directed to temporary heating during start up, taxi and takeoff but rather to a permanent system used in conjunction with an air conditioning system. A blower is used, however, it is located downstream of a condenser and is only effective for helicopter turbines. Use of this system with small planes would not be possible.

In U.S. Pat. No. 2,265,168, issued to W. E. Huffinan on Dec. 9, 1941, a heat exchanger is located within the exhaust manifold or exhaust pipes, the principal idea being that the pressure produced by a blower from the cold air inlet maintains pressure through the heat exchanger greater than the pressure within the exhaust manifold. Thus the blower is not used to push air past the exhaust manifold in the takeoff or taxiing position but rather is used to continuously keep the pressure up such that if a leak in the heat exchanger develops, CO or other exhaust gases will not enter into the system which provides warmed air to the cabin. The invention does not use a typical shrouded engine muff heat exchanger which is common in present day small planes but rather the heat exchanger is found within the exhaust manifold. Furthermore, this invention is not used on a temporary basis for start up, warm up, taxi and takeoff.

SUMMARY OF THE INVENTION

The present invention provides an attachment or add on to the existing cabin heating system of a small plane. The attachment comprises a blower connected to an air intake aperture usually in the engine housing. Once the aircraft is in the air, the system may be shut off as ram air enters through the aperture automatically. The inventor replaces the normal hose attached to the aperture with another hose and a three or four-inch blower fan. The blower is mounted on the engine baffle and connects with an air duct hose which leads to the inlet of the muffler shroud or heat exchanger. The boosted air from the blower warms the cabin and defogs the windshield, much improving visibility for the pilot and comfort for the passengers.

Therefore, this invention seeks to provide an auxiliary heating and defrosting system, adapted to provide warmed air to a cabin of a small aircraft; said system including:

at least one blower adapted to be connected to a flange and an engine compartment baffle wall;

said flange being also connected to said engine compartment baffle wall around a pre-existing air intake aperture;

said system also including an air duct hose and a first clamp;

said clamp being adapted to secure a first end of said air duct hose around an air outlet end of said blower;

said air duct hose also including a second end;

said second end being connected by a second clamp to a muffler shroud air intake aperture;

said muffler shroud also including an air outlet aperture connected to a cabin air intake hose;

said muffler shroud encircling and enclosing an airspace about an exhaust muffler;

said exhaust muffler forming an existing portion of an exhaust system of a small aircraft engine;

said system also including electrical circuit breaker wiring and an on/off circuit breaker switch;

said electrical circuit breaker wiring being connected to an electrical source in said aircraft, said blower, and said circuit breaker switch;

said switch being located in said small aircraft cabin; and wherein, in operation, when said circuit breaker switch is in an "on" position, said blower forces outside ambient air through said muffler shroud into said cabin.

The present invention is extremely simple, but solves an old problem existing in small aircraft during winter conditions. To alleviate this problem, a person removes the engine cowl from the small aircraft, and thereafter removes the existing three-inch air duct hose located between the engine compartment baffle wall and the muffler shroud. A three-inch coupler clamp is applied over the baffle wall flange. A turbo in-line blower, capable of blowing approximately 145 cubic feet per minute, is installed on the cool air side of the engine compartment baffle wall, adjacent an air intake aperture by means of a bracket. This is installed upstream from the heat muff, never downstream. The blower is also attached to the engine compartment baffle wall by a second screw. An LED light and switch are installed in the control panel of the aircraft close to the heater control.

In operation, as soon as the aircraft engine is started, the off/on switch is placed "on" and warm air immediately begins to enter the cabin and the window defrosting ducts. The blower remains operative until the aircraft is in flight; thereafter, the blower is generally turned "off".

The present invention may be removed during the summer and the original air duct hose returned to its original position. Although this is not necessary, it does prolong blower life.

DETAILED DESCRIPTION OF THE DRAWINGS

Figure 1:
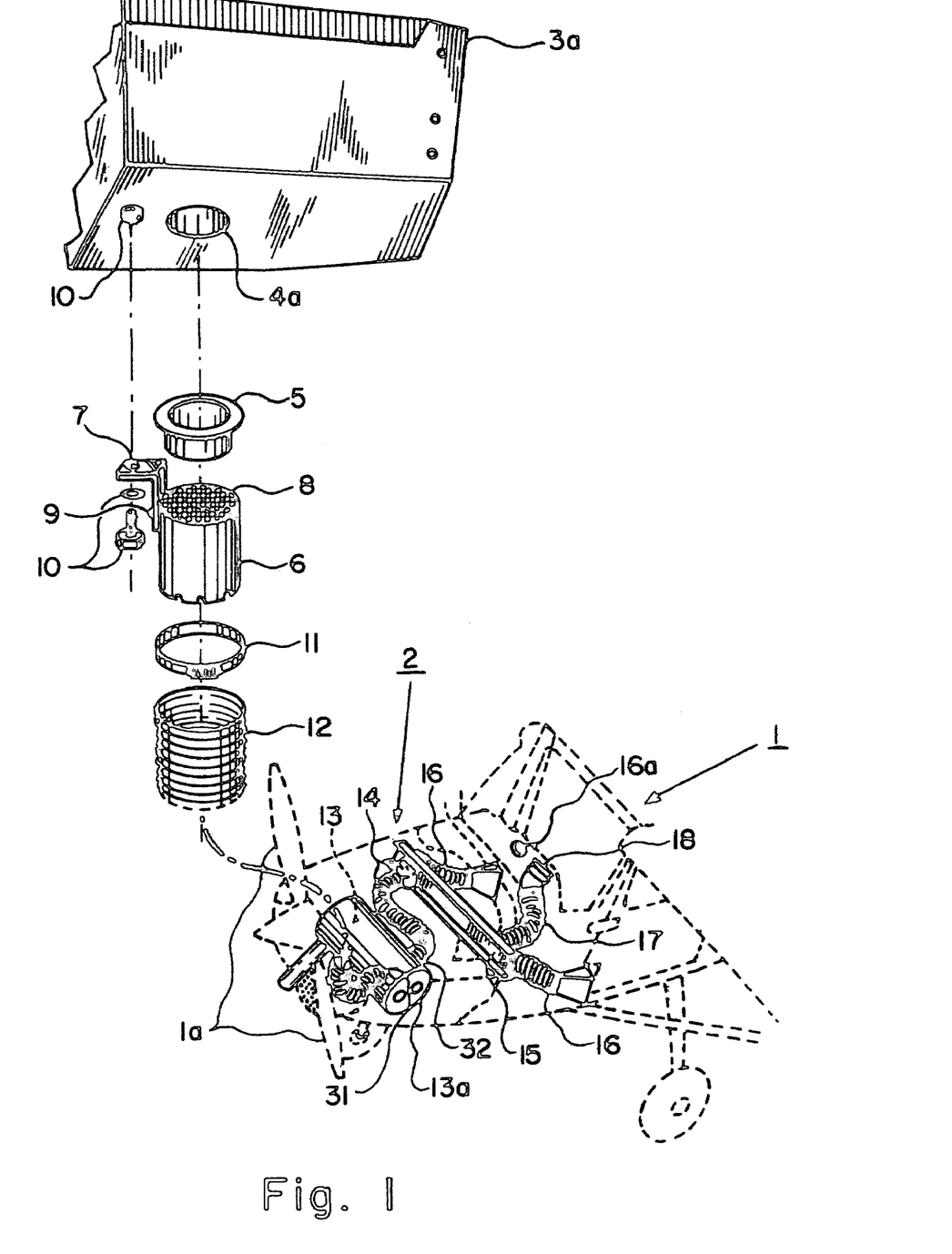
FIG. 1 is an exploded view of the components of the present invention as installed in a Cessna 172 aircraft.

FIG. 1 shows an aircraft marked generally as 1, having a propeller 1a and an engine compartment marked as 2. At the front of the engine compartment is an engine compartment front baffle wall 3a. In engine baffle wall 3a is an air intake aperture 4a. When the plane is in flight at normal speed, ram air is forced through aperture 4a with movement of the aircraft. Permanently attached to engine baffle wall 3a around aperture 4a is a flange 5. This is normally attached to an air duct hose connected to an exhaust muffler shroud (air duct hose not present in FIG. 1).

A blower 6 is attached with L-shaped bracket 7 by means of a bolt, nut and washer 10 to the engine baffle wall 3a. The bracket 7 is attached to the side of the blower by means of a bolt 9. The blower is equipped with a meshed covering 8 to avoid any debris entering the blower. A clamp 11 secures a downstream end of the blower 6 to an air duct hose 12. Air duct hose 12 is connected to the inlet hole 31 of a muffler shroud 13a. A muffler shroud is basically an enclosed space or compartment located around the muffler. Warmed air leaves the muffler shroud 13a via muffler shroud outlet hose 14 which is connected to muffler shroud air outlet 32.

In operation, warmed air moves through the firewall blower channel 15 and is then directed through cabin heater ducts 16 and defroster duct 17 to defroster nozzle 18.

It is to be understood that muffler shroud 13a, outlet hose 14, firewall blower channel 15, cabin heater duct 16, defroster duct 17 and defroster nozzle 18 are pre-existing parts of the Cessna 172 aircraft.

Figure 2:
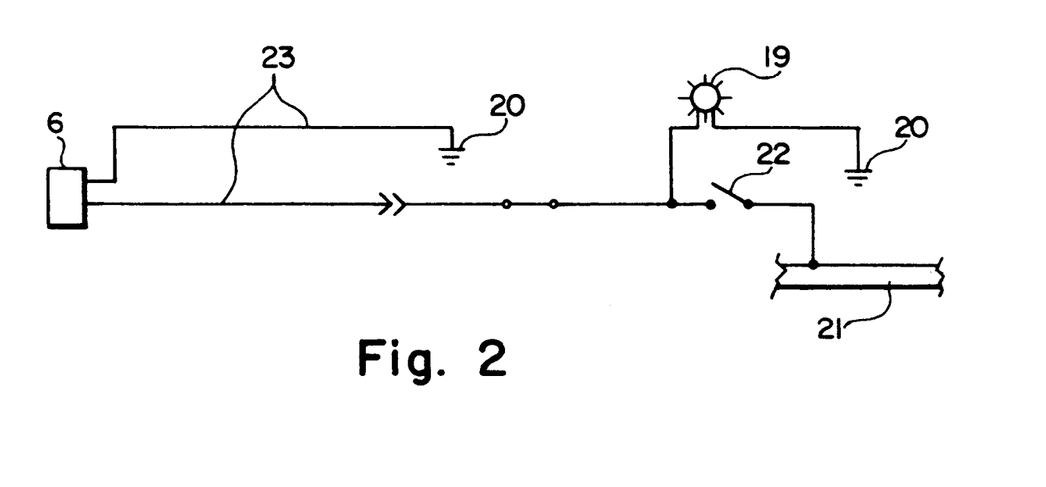
FIG. 2 is a wiring diagram for the same invention as shown in FIG. 1.
Figure 3:
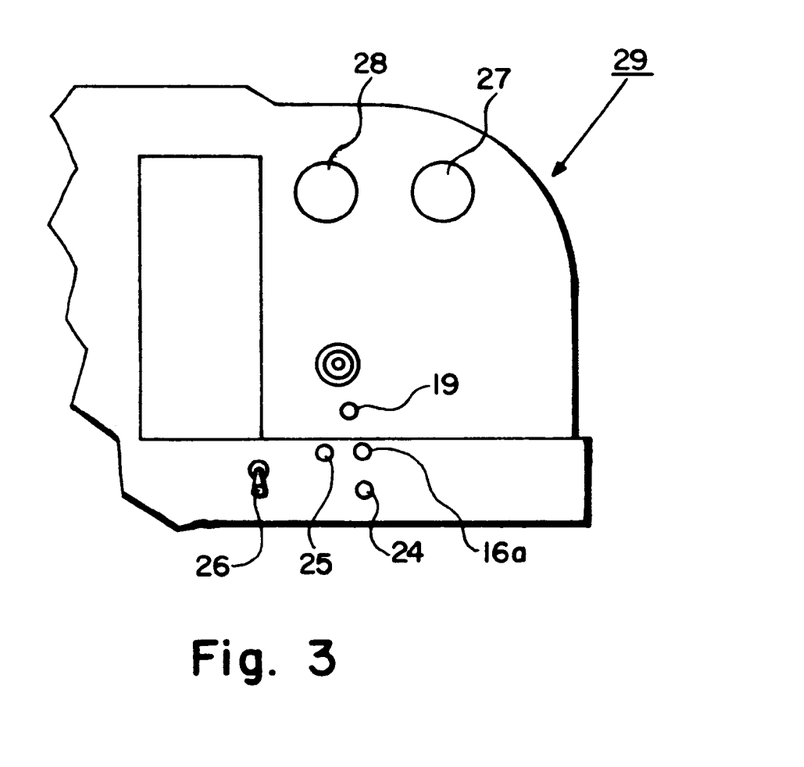
FIG. 3 is the front view of the control panel in the same Cessna 172.

FIG. 2 is a schematic view of the wiring diagram for the invention shown in FIG. 1. There is a blower indicator light 19 connected to the wiring system. It is mounted on the control panel in the cabin as shown in FIG. 3. The wiring system is grounded at 20 on both the cabin wall and the firewall. The blower receives power through the wiring system from the main bus bar or source of electricity in the aircraft. The bus bar is marked as 21. The circuit breaker is shown as number 22. This is connected to the blower circuit breaker switch 25 shown in FIG. 3. Wiring 23, located ahead of the firewall, connects with blower 6.

On the cabin control panel, as shown in FIG. 3, there is a cabin heat duct control 16a, a cabin air control 24, and as previously mentioned, the newly added blower circuit breaker switch 25. Numeral 26 is the flap control; numeral 27 is the avionics indicator; and a numeral 28 is the carburetor temperature indicator. The control panel is shown generally as 29.

It is to be understood that FIG. 3 is a pre-existing control panel of the Cessna 172 model series aircraft and indicates where the new LED light 19 and circuit breaker switch 25 are to be installed.

Figure 4:
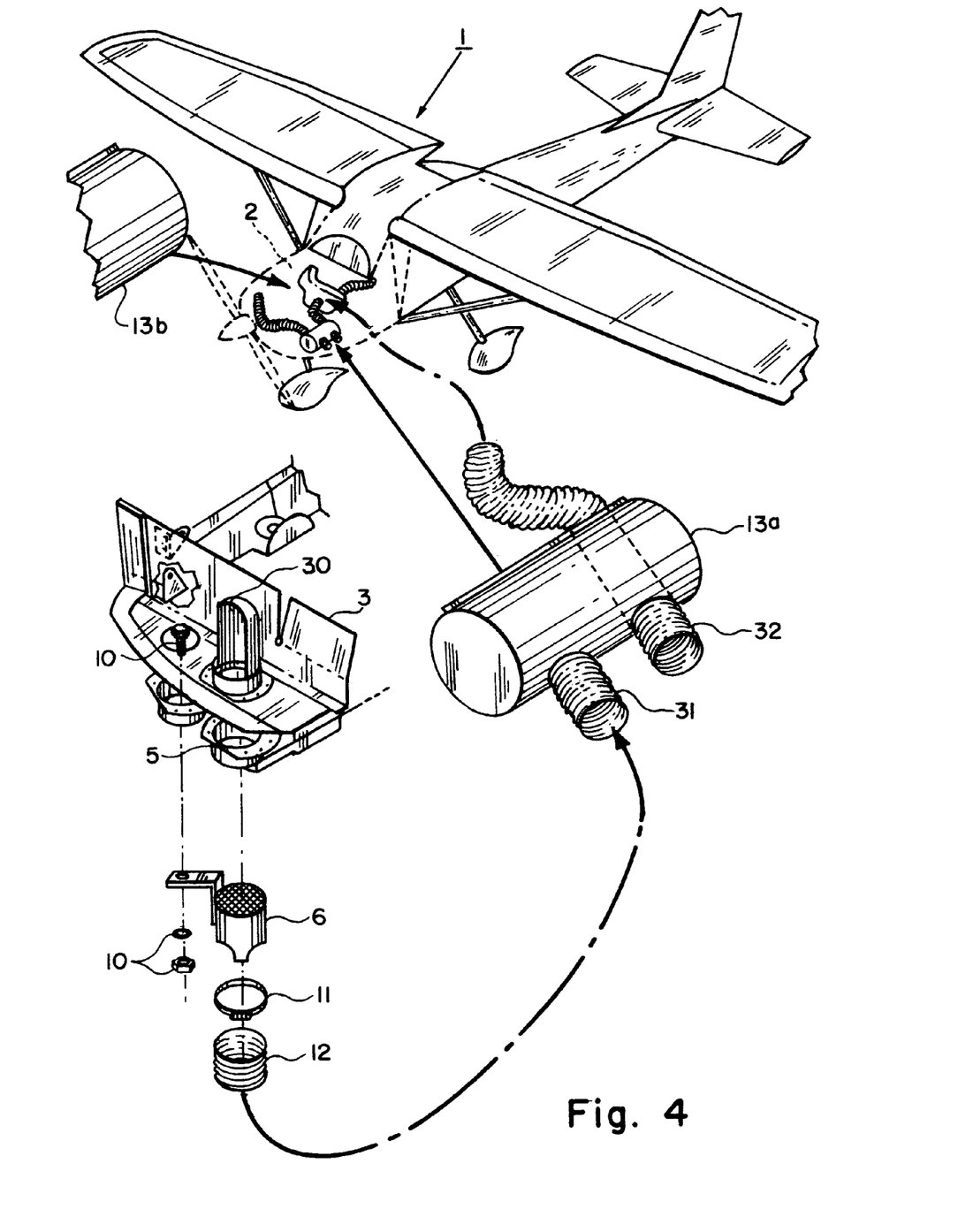
FIG. 4 is an exploded view of the invention as used with a Cessna 150 aircraft.

In FIG. 4, the invention is shown installed in a Cessna 150 aircraft. In the Cessna 150, there are two mufflers, each with a muffler shroud and two air intakes; hence, two blowers can be used. The muffler shrouds are shown in FIG. 4 as 13a and 13b. The Cessna 150 is also equipped with air scoops 30 located above the apertures on the outside of the front engine compartment baffle wall 3. Although only one blower 6 is shown connected to flange 5 and firewall 3 by nuts and bolts 10 in FIG. 4, it is understood that in this particular aircraft, a blower for each air aperture may be used and one air duct hose 12 leads to air inlet 31 of muffler shroud 13a while another blower 6 and air duct hose 12, are connected to an air inlet on muffler shroud 13b.

Figure 5:
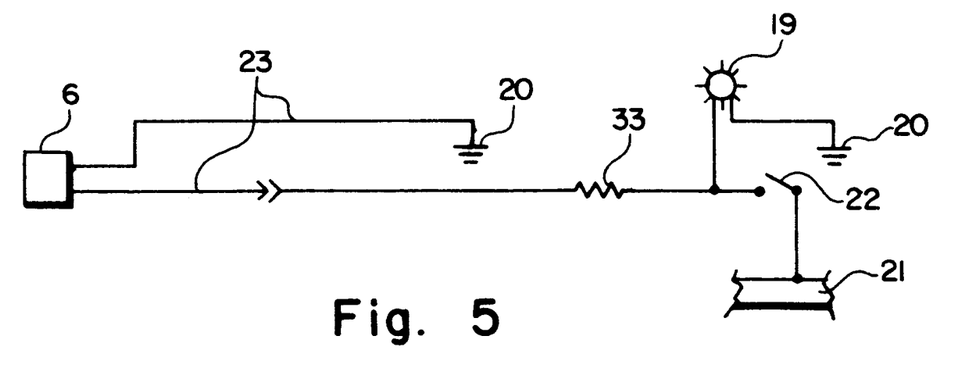
FIG. 5 is a wiring diagram used in the Cessna 150.

FIG. 5 is a wiring diagram for the blower shown in FIG. 4. It is similar to FIG. 2 except that when using a 24-volt system, a resistor 33 is placed in the wiring system 23.

Figure 6:
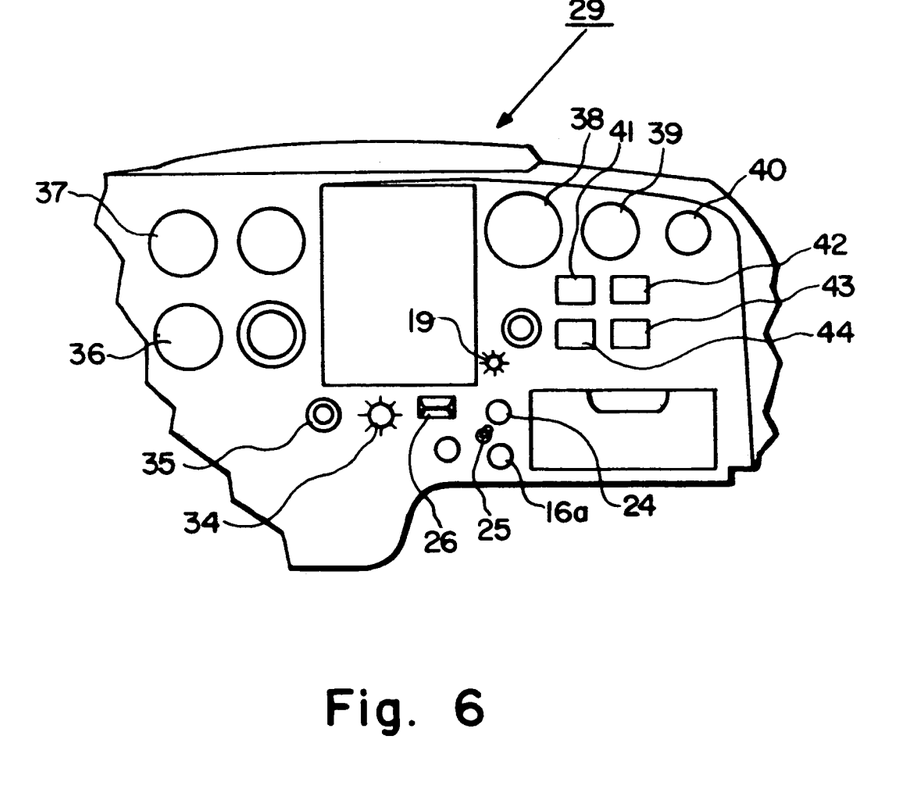
FIG. 6 is a front view of the control panel of the Cessna 150.

FIG. 6 shows the existing control panel of the aircraft shown in FIG. 4. It is understood that FIG. 6 is used simply to show the installed location of the new LED light 19 and the blower on/off switch 25. FIG. 6 shows a mixture control dial 34, throttle 35, a vertical speed indicator 36, an altimeter 37, a tachometer 38, an hour and meter 39, a suction gauge 40, a left-hand fuel gauge indicator 41, a right-hand fuel gauge 42, an oil temp gauge 43 and an oil pressure gauge 44.

Figure 7:
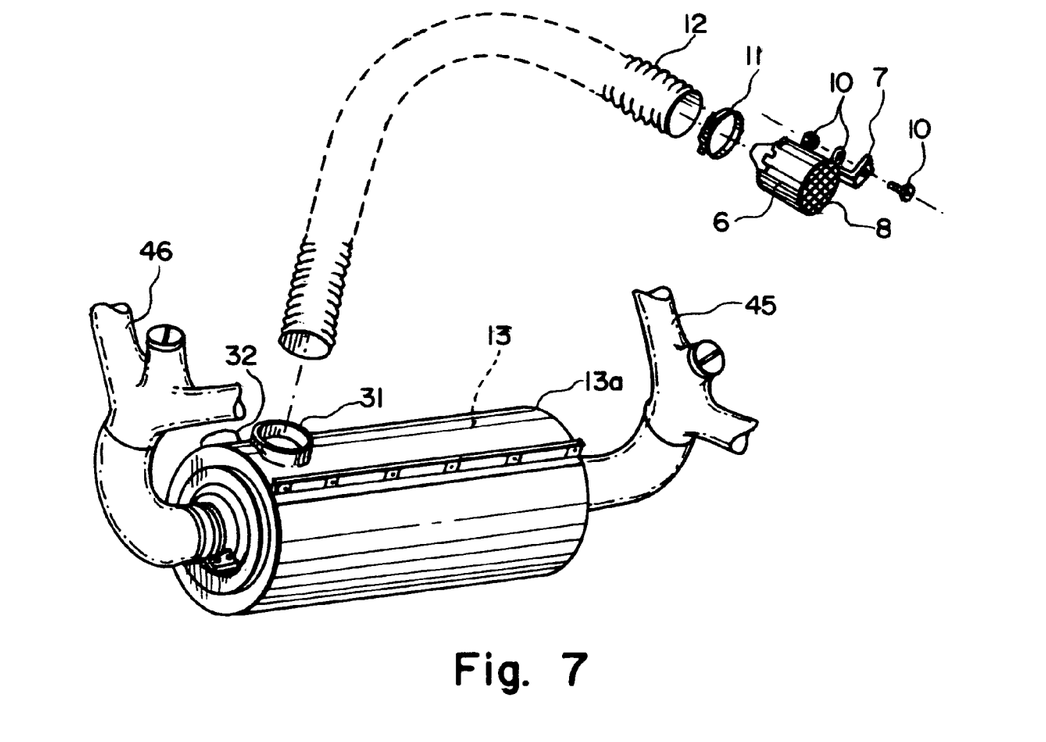
FIG. 7 is a schematic view of the invention used in the Cessna 180 and 182 model aircraft.

FIG. 7 is a schematic view of the invention as used in Cessna 180, 182 aircraft. FIG. 7 is an illustration which shows that an air intake aperture 4b need not be in the front engine compartment baffle wall but rather can also be located in the rear engine compartment baffle wall 3b. Thus blower 6 is attached to a flange (not shown) located on rear engine compartment baffle wall 3b. Also shown in FIG. 7, joined to exhaust muffler 13, are exhaust system inlets 45 and 46.

Figure 8:
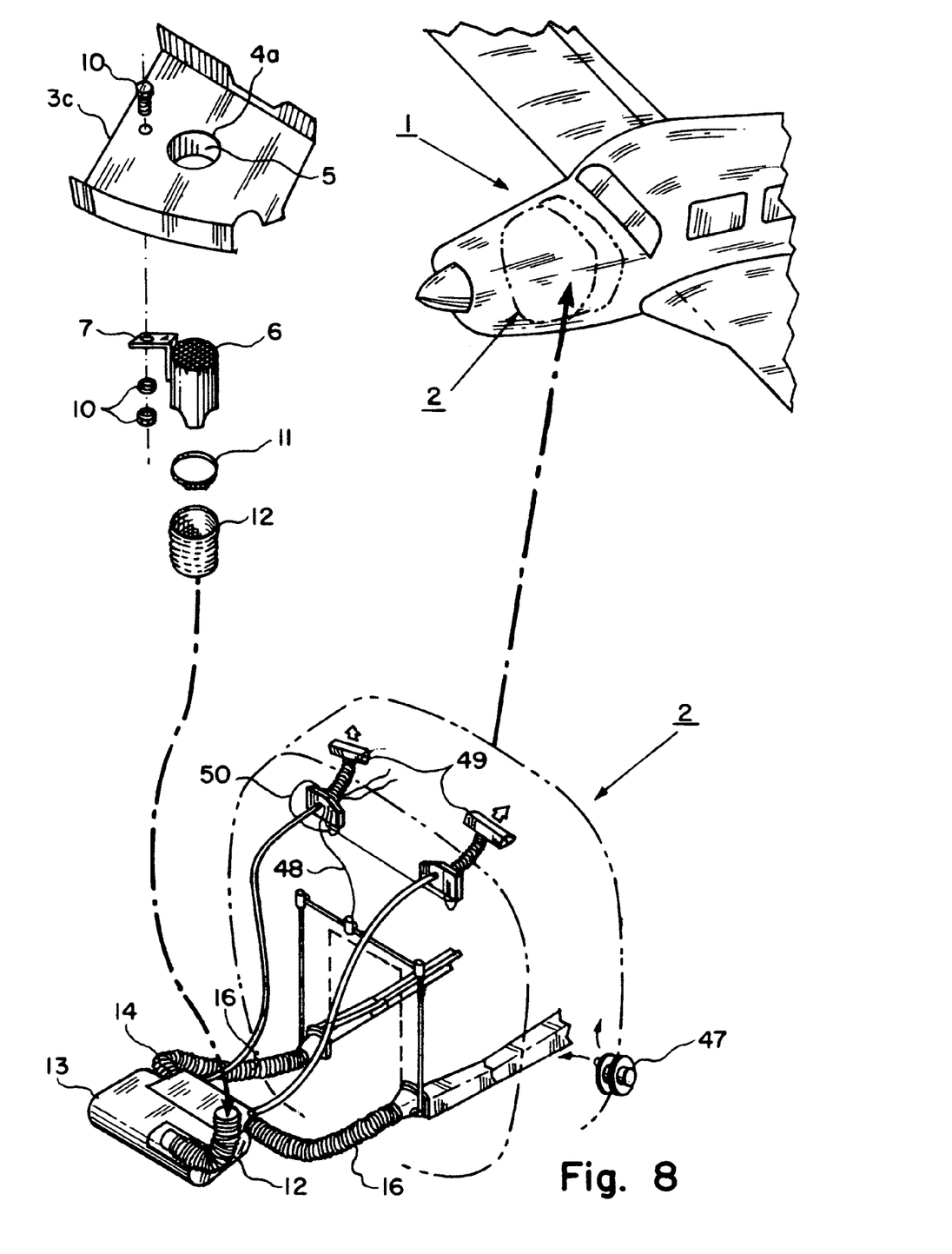
FIG. 8 is an exploded view of the invention used in conjunction with a Piper PA 28 series aircraft.

FIG. 8 shows the invention as applied to a Piper PA 28 series aircraft. The air intake aperture in this particular aircraft is located in the left-hand forward engine compartment baffle 3c. The Piper PA 28 series is equipped with fresh air inlet knob 47, a cabin heat shutoff 48, defroster ducts 49 and defroster control 50.

Figure 9:
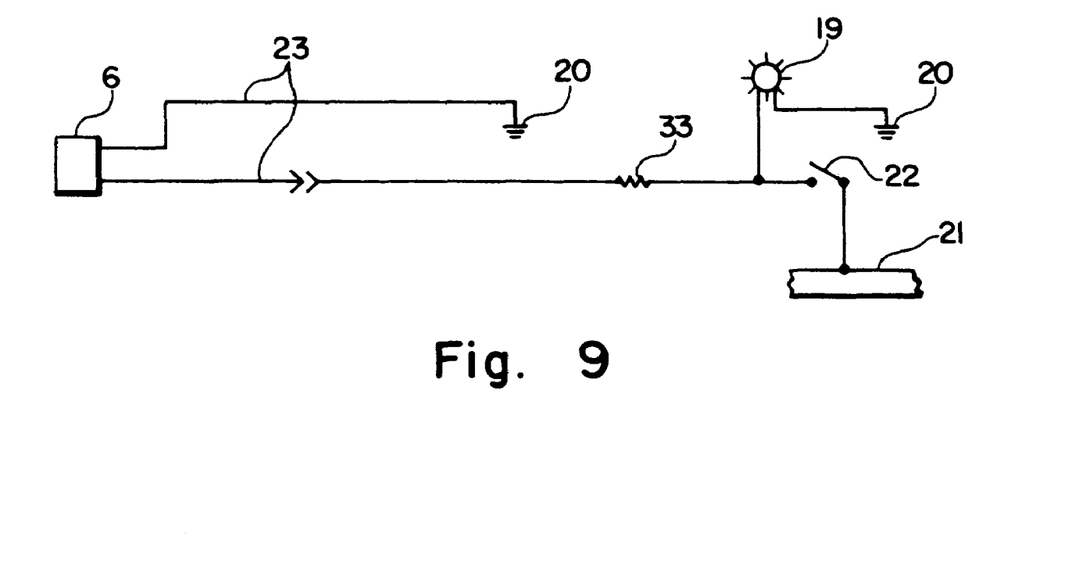
FIG. 9 is the wiring diagram for the said Piper aircraft.

FIG. 9 is the wiring system for blower 6 for the Piper PA 28 series aircraft and is very similar to the wiring systems shown for the previous aircraft.

Figure 10:
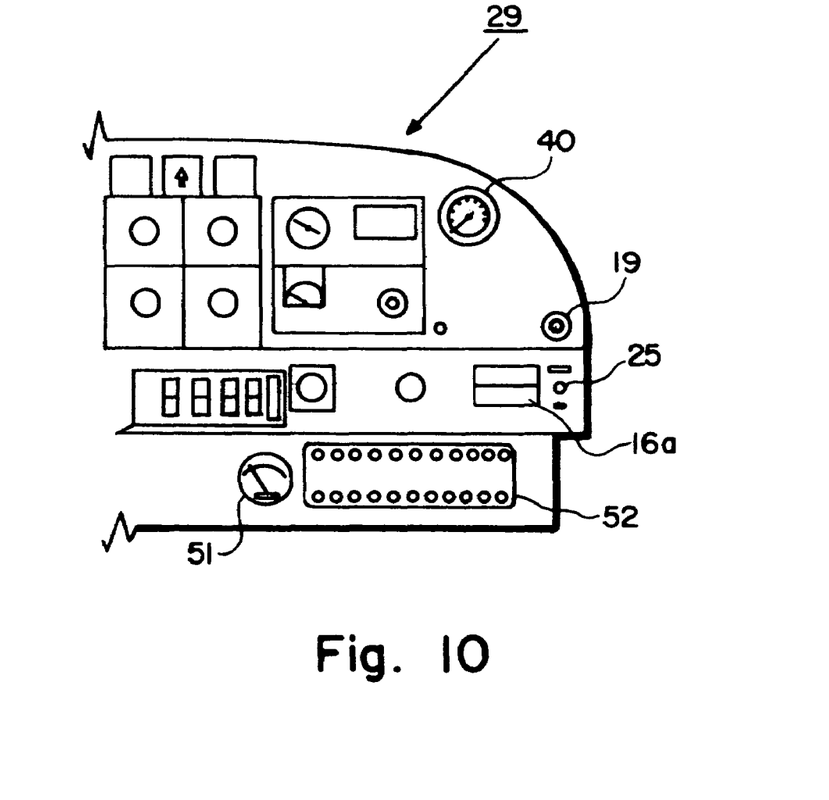
FIG. 10 is a front view of the control panel of the Piper PA 28 series aircraft.

FIG. 10 is a front view of the dash 29 for the Piper aircraft, showing in addition, an ammeter 51 and a circuit breaker panel 52, as well as the other usual controls. Placement of the blower switch 25 and the LED light 19 are indicated.

What is claimed is:

1. A supplementary airplane cabin heat delivery device with an airplane with an air cooled piston engine partially enclosed by a cowling with an air inlet in said cowling; said engine including an enclosed exhaust system for allowing exhaust gases to exit said air cooled piston engine; said device comprising: at least one electrically powered blower connected to said air inlet in said cowling; said electrically powered blower having an inlet and an outlet; said blower outlet being connected to an inlet of an elongated heat shroud used for collecting heat from said aircraft engine exhaust system; wherein said outlet from said heat shroud is ducted into said airplane cabin to deliver heated air to said airplane cabin when said air cooled piston engine is in operation and said airplane is in taxiing and stationary positions; and said blower replacing ram air which is used to heat said cabin when said aircraft is in flight.

2. A supplementary airplane cabin heat delivery device as in claim 1 wherein said electrically powered blower is an axial blade blower.

3. A supplementary airplane cabin heat delivery device as in claim 1 wherein said heated air is ducted to an airplane windshield defrost system.

4. A supplementary airplane cabin heat delivery device as claimed in claim 3 wherein at least two said electronically powered blowers are connected in series to deliver heated air to said airplane cabin and said windshield defrost system.

5. A supplementary airplane cabin heat delivery device as claimed in claim 1 wherein a second electrically powered blower is connected in series to said at least one blower for increasing volume of heated air for delivery to said airplane cabin and windshield defrost system.

6. An auxiliary heating and defrosting system adapted to provide warmed air to a cabin of a small aircraft; said system including at least one blower, connected to a flange, and an engine compartment baffle wall; said flange being also connected to said engine compartment baffle wall around a pre-existing air intake aperture; said system also including an air duct hose and a first clamp; said clamp being adapted to secure a first end of said air duct hose around an air outlet end of said blower; said air duct hose also including a second end; said second end being connected by a second clamp to a muffler shroud air intake aperture; said muffler shroud also including an air outlet aperture connected to a cabin air intake hose; said muffler shroud including and enclosing an air space about an exhaust muffler; said exhaust muffler and said muffler shroud forming existing portions of an exhaust system of a small aircraft engine; said system also including electrical circuit breaker wiring and an on/off circuit breaker switch; said electrical circuit breaker wiring being connected to an electrical source in said aircraft, said blower, and said circuit breaker switch; said switch being located in said small aircraft cabin; wherein, in operation, when said circuit breaker switch is in an "on" position, said blower forces air through said muffler shroud into said cabin.

7. A system as claimed in claim 6 including a pair of blowers connected to a pair of flanges attached around a pair of pre-existing air intake apertures in said engine compartment baffle wall; each of said blowers being connected to an air duct hose; said system further including a pair of exhaust mufflers; each of said air duct hoses being connected to a muffler shroud air intake aperture in one of said exhaust mufflers; each of said exhaust mufflers including one air outlet aperture leading from said muffler shroud to a cabin air intake hose.

8. A system as claimed in claim 6 wherein said pre-existing air intake aperture is located in a front engine compartment baffle wall.

9. A system as claimed in claim 6 wherein said pre-existing air intake aperture is located in a side engine compartment baffle wall.

10. A system as claimed in claim 6 wherein said pre-existing air intake aperture is located in a rear engine compartment baffle wall.

11. A system as claimed in claim 6 wherein an air scoop is located on an outside portion of said engine compartment baffle wall adjacent said aperture.

12. A system as claimed in claim 6 wherein said blower is located within said air duct hose.

13. A system as claimed in claim 6 wherein said at least one blower is coupled in series with a second blower embedded in an air duct hose to increase cabin air flow.

* * * * *